US012668182B2

(12) United States Patent (10) Patent No.: US 12,668,182 B2

Sakaguchi (45) Date of Patent: Jun. 30, 2026

(54) VEHICLE OBSTACLE ALARM DEVICE

(71) Applicant: TOYOTA JIDOSHA KABUSHIKI KAISHA, Toyota (JP)

(72) Inventor: Atsutoshi Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/952,355

(22) Filed: Nov. 19, 2024

(65) Prior Publication Data

US 2025/0187538 A1     Jun. 12, 2025

(30) Foreign Application Priority Data

Dec. 8, 2023 (JP) ................................. 2023-208033

(51) Int. Cl.
 *B60Q 9/00*          (2006.01)
 *G08G 1/16*          (2006.01)
(52) U.S. Cl.
 CPC .............. *B60Q 9/00* (2013.01); *G08G 1/168* (2013.01)
(58) Field of Classification Search
 CPC ................................. B60Q 9/00; G08G 1/168
 See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |
| 11,110,937 | B2 | 9/2021 | Kinoshita et al. |
| 12,254,701 | B2 * | 3/2025 | Miyamoto ............. G06V 20/58 |
| 2016/0075332 | A1 * | 3/2016 | Edo-Ros .......... B60W 30/0956 |
| | | | 701/70 |
| 2016/0217333 | A1 * | 7/2016 | Ozawa ............. G08G 1/096783 |
| 2017/0158127 | A1 * | 6/2017 | Akiyama .............. B60W 50/14 |
| 2018/0178722 | A1 * | 6/2018 | Ohta ....................... G01S 13/08 |
| 2019/0001968 | A1 | 1/2019 | Yorifuji et al. |
| 2019/0344828 | A1 | 11/2019 | Omori et al. |
| 2019/0389488 | A1 | 12/2019 | Yamada et al. |
| 2020/0026277 | A1 * | 1/2020 | Palanisamy ......... B60W 60/001 |
| 2020/0047667 | A1 * | 2/2020 | Ji ............................ E05B 77/54 |
| 2022/0055531 | A1 * | 2/2022 | Sugimoto ............ G06V 10/145 |
| 2022/0118970 | A1 * | 4/2022 | Takaki .................. B60W 50/14 |

(Continued)

FOREIGN PATENT DOCUMENTS

JP          2018-103647 A          7/2018

*Primary Examiner* — Hussein Elchanti

(74) *Attorney, Agent, or Firm* — SoraIP, Inc.

(57) ABSTRACT

A vehicle obstacle alarm device includes: an alarm generation device capable of changing a form of an alarm; a ranging device that measures a distance between a vehicle and an obstacle around the vehicle; and a driving assistance ECU configured to switch the form of the alarm according to the distance between the vehicle and the obstacle. The driving assistance ECU changes a condition for switching the form of the alarm such that the condition for switching the form of the alarm when both a first distance and a second distance are equal to or smaller than a reference value differs from the condition for switching the form of the alarm when only one of the first and second distances is equal to or smaller than the reference value.

5 Claims, 5 Drawing Sheets

(56)        References Cited

U.S. PATENT DOCUMENTS

| | | | |
|---|---|---|---|
| 2022/0388505 A1* | 12/2022 | Sharma Banjade | ........................ B60W 30/0956 |
| 2023/0154330 A1* | 5/2023 | Li ........................ | G08G 1/0112 701/301 |
| 2023/0159056 A1* | 5/2023 | Cheng ............... | B60W 50/0098 701/301 |

* cited by examiner (STANDARD MODE)
(INTERMITTENT SOUND)

(STANDARD MODE)
(CONTINUOUS SOUND)

(NARROW MODE)
(INTERMITTENT SOUND)

(NARROW MODE)
(CONTINUOUS SOUND)

VEHICLE OBSTACLE ALARM DEVICE

CROSS-REFERENCE TO RELATED APPLICATION

This application claims priority to Japanese Patent Application No. 2023-208033 filed on Dec. 8, 2023, incorporated herein by reference in its entirety.

BACKGROUND

1. Technical Field

The present disclosure relates to an obstacle alarm device for a vehicle, such as an automobile.

2. Description of Related Art

As one of obstacle alarm devices for vehicles, such as automobiles, there is a known obstacle alarm device that is configured to generate an alarm upon determining that a distance between the vehicle and an obstacle is equal to or smaller than a reference value. For example, Japanese Unexamined Patent Application Publication No. 2018-103647 (JP 2018-103647 A) describes an obstacle alarm device configured to change the form of the alarm according to the distance between the vehicle and an obstacle, and to vary the sound pressure of the alarm between when the vehicle moves toward the obstacle and when the vehicle moves away from the obstacle.

SUMMARY

In the conventional obstacle alarm device like the device described in JP 2018-103647 A, the alarm does not change when the distance between the vehicle and the obstacle is equal to or smaller than the reference value and that distance does not change. For example, when the vehicle travels on a narrow travel road with obstacles, such as walls, on both sides, the alarm is generated as long as the distance between the vehicle and at least one of the obstacles is equal to or smaller than the reference value. Thus, the alarm is the same for when the vehicle travels close to only one of the obstacles on both sides and when the vehicle travels close to both the obstacles on both sides. Therefore, even when the driver recognizes the alarm, the driver cannot determine whether the vehicle is traveling close to only one of the obstacles on both sides or the vehicle is traveling close to both the obstacles on both sides, i.e., whether the vehicle is traveling at a central position between the two obstacles.

This problem arises also when moving one's own vehicle in a situation where there are obstacles, such as other vehicles or walls, on the front and rear sides of the vehicle, like when parking or starting one's own vehicle in a parking lot where a plurality of vehicles is parked around it.

The present disclosure provides an obstacle alarm device that is improved such that, when a vehicle travels between two obstacles present on both sides, a driver can determine whether the vehicle is traveling at a central position between the two obstacles.

The present disclosure provides a vehicle obstacle alarm device (100) including: an alarm generation device (52) capable of changing a form of an alarm; a ranging device (a sonar device 16) that measures a distance between a vehicle (102) and an obstacle around the vehicle; and a control unit (a driving assistance ECU 10) configured to switch the form of the alarm generated by the alarm generation device according to the distance between the vehicle and the obstacle measured by the ranging device.

The ranging device (the sonar device 16) measures a first distance (L1) between a first obstacle and a first end portion that is one of a plurality of end portions of the vehicle and closest to the first obstacle, and a second distance (L2) between a second obstacle and a second end portion that is another of the plurality of end portions of the vehicle and closest to the second obstacle.

The control unit (the driving assistance ECU 10) is configured to change a condition for switching the form of the alarm (S80, S85) such that the condition for switching the form of the alarm (S80, S85) when both the first and second distances (L1 and L2) are equal to or smaller than a reference value (Lc2) differs from the condition for switching the form of the alarm (S30, S50) when only one of the first and second distances (L1 or L2) is equal to or smaller than the reference value.

According to this configuration, the condition for switching the form of the alarm when both the first and second distances are equal to or smaller than the reference value differs from the condition for switching the form of the alarm when only one of the first and second distances is equal to or smaller than the reference value. Therefore, also in a situation where the vehicle travels between two obstacles which are present on both sides of the vehicle and between which the space is constant and small, as the condition for switching the form of the alarm is appropriately changed, it is possible to determine whether the vehicle is close to only one of the obstacles or the vehicle is close to both the obstacles.

In one aspect of the present disclosure, the control unit (the driving assistance ECU 10) is configured to switch the form of the alarm such that, before the condition for switching the form of the alarm is changed, the form of the alarm is a first form (S40) when the first or second distance is equal to or smaller than a first reference value (Lc1) and larger than a second reference value (Lc2), while the form of the alarm is a second form (S60) when the first or second distance is equal to or smaller than the second reference value.

In another aspect of the present disclosure, the control unit (the driving assistance ECU 10) is configured to change the condition for switching the form of the alarm (S85) by changing the second reference value to a smaller value (Lc2') when both the first and second distances (L1 and L2) become equal to or smaller than the second reference value (Lc2).

In yet another aspect of the present disclosure, the control unit (the driving assistance ECU 10) is configured to switch the form of the alarm (S70) such that, in a case where the condition for switching the form of the alarm has been changed, the form of the alarm is the first form (S90) when a magnitude of a difference between the first and second distances is equal to or smaller than a reference value (Lc3) for the difference, while the form of the alarm is the second form (S100) when the magnitude of the difference is larger than the reference value for the difference.

In still another aspect of the present disclosure, the control unit (the driving assistance ECU 10) is configured to, when changing the condition for switching the form of the alarm, let a driver know the change in the condition for switching the form of the alarm (S70).

Other objects of the present disclosure described above as well as other characteristics thereof and the accompanying advantages will be easily understood from the following description of embodiments of the present disclosure that will be given with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An obstacle alarm device according to an embodiment of the present disclosure will be described in detail below with reference to the accompanying drawings.

Figure 1:
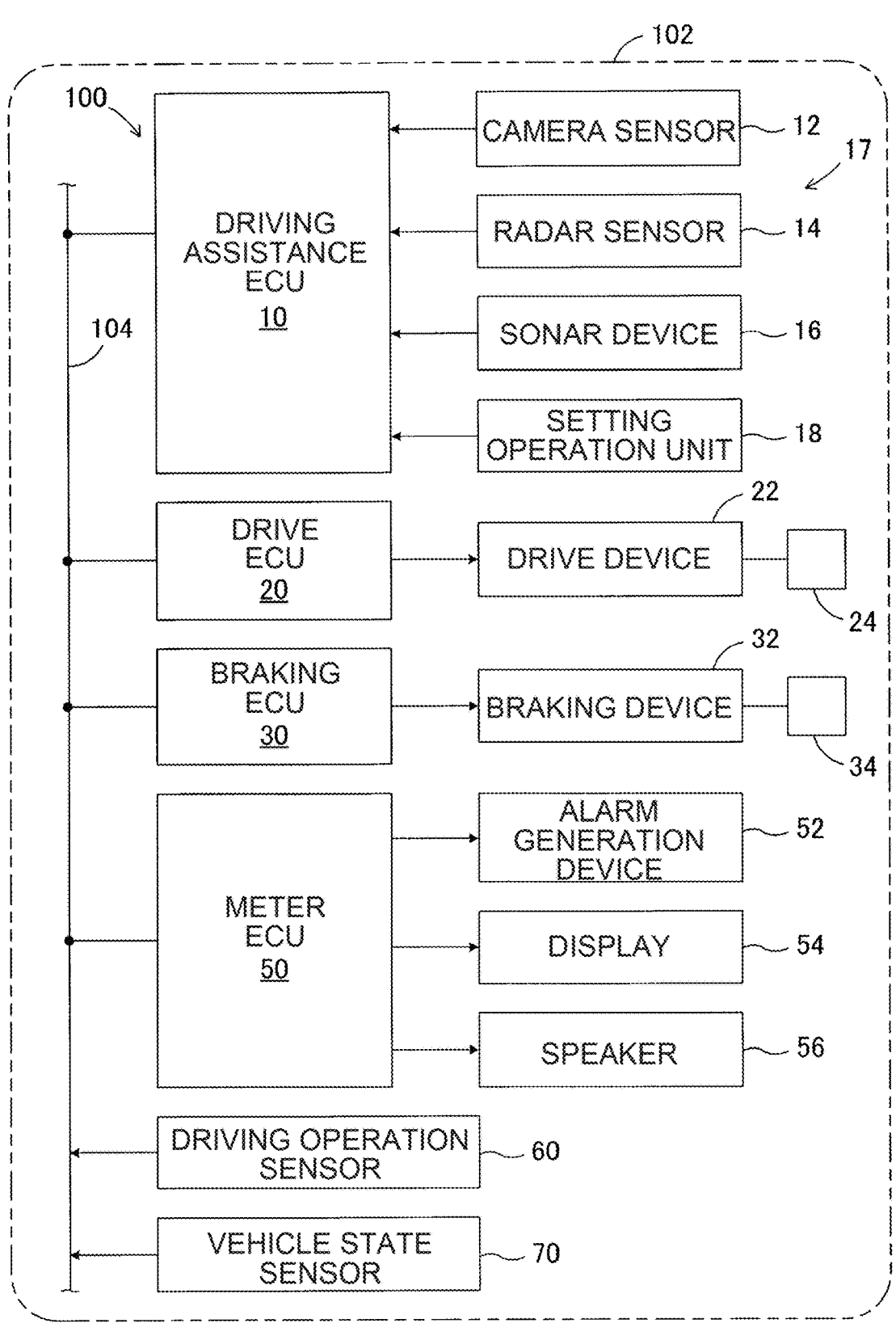
FIG. 1 is a schematic configuration diagram showing an obstacle alarm device according to an embodiment.

As shown in FIG. 1, an obstacle alarm device 100 according to the embodiment of the present disclosure is applied to a vehicle 102 and includes a driving assistance ECU 10. The vehicle 102 is a vehicle capable of autonomous driving, and includes a drive ECU 20, a braking ECU 30, and a meter ECU 50. The term ECU means an electronic control unit including a microcomputer as a major unit.

The microcomputer of each ECU includes a CPU, an ROM, an RAM, a readable and writable non-volatile memory (N/M), an interface (I/F), etc. The CPU realizes various functions by executing instructions (programs, routines) stored in the ROM. Further, these ECUs are connected to one another through a controller area network (CAN) 104 so as to be able to exchange data (communicate). Thus, detection values etc. of sensors (including switches) connected to a certain ECU are also transmitted to the other ECUs.

The driving assistance ECU 10 is a central control device that performs travel control for driving assistance, such as obstacle alarm control, following vehicle distance control, and lane keep control. In the embodiment, as will be described in detail later, the driving assistance ECU 10 executes the obstacle alarm control for the vehicle 102 in cooperation with the other ECUs.

A camera sensor 12, a radar sensor 14, a sonar device 16, and a setting operation unit 18 are connected to the driving assistance ECU 10. The camera sensor 12 and the radar sensor 14 include a plurality of camera devices and a plurality of radar devices, respectively, and the sonar device 16 includes a plurality of sonars. The camera sensor 12, the radar sensor 14, and the sonar device 16 function as obstacle information acquisition devices 17 that acquire information on obstacles around the vehicle 102.

While this is not shown in the drawings, each camera device of the camera sensor 12 includes a camera unit that images the surroundings of the vehicle 102, and a recognition unit that recognizes targets, such as white lines of roads and other vehicles, by analyzing image data obtained by imaging in the camera unit. The recognition unit supplies information about the recognized targets to the driving assistance ECU 10 at predetermined time intervals.

Each radar device of the radar sensor 14 includes a radar transmission-reception unit and a signal processing unit (not shown). The radar transmission-reception unit emits electric waves in a millimeter-wave band (hereinafter referred to as "millimeter waves"), and receives millimeter waves reflected by a three-dimensional object present within a range of emission (e.g., another vehicle, a wall, etc.) (i.e., reflected waves). Based on a phase difference between the transmitted millimeter waves and the received reflected waves, an attenuation level of the reflected waves, a time from the transmission of the millimeter waves to the reception of the reflected waves, etc., the signal processing unit supplies information showing a distance between the own vehicle and the three-dimensional object, a relative speed between the own vehicle and the three-dimensional object, a relative position (direction) of the three-dimensional object relative to the own vehicle, etc. to the driving assistance ECU 10 at predetermined time intervals. A light detection and ranging (LiDAR) may be used instead of the radar sensor 14 or in addition to the radar sensor 14.

The sonar device 16 includes a plurality of sonars, and these sonars are provided at a plurality of positions in an outer peripheral part of the vehicle 102, for example, at a left front end corner portion 102FL, a right front end corner portion 102FR, a left rear end corner portion 102RL, and a right rear end corner portion 102RR. The sonars may be provided also at a front end portion 102F of the vehicle between the left front end corner portion and the right front end corner portion and at a rear end portion 102R of the vehicle between the left rear end corner portion and the right rear end corner portion. Each sonar is configured to transmit ultrasonic waves in a direction away from the vehicle 102, and to receive ultrasonic waves that the sonar has transmitted and that has been reflected by an object, i.e., direct waves, as well as receive ultrasonic waves that another sonar has transmitted and that has been reflected by an object, i.e., indirect waves. Further, each sonar is configured to output a signal indicating a peak value of received voltages corresponding to the received ultrasonic waves, and hence a signal indicating a peak value of the received ultrasonic waves to a control device of the sonar device 16.

When the peak value is equal to or higher than a reference value, the control device of the sonar device 16 determines that a corresponding sonar is receiving ultrasonic waves. Further, based on flying times of the direct waves and the indirect waves, the control device of the sonar device 16 infers a distance between the vehicle 102 and the object having reflected the direct waves and the indirect waves and a direction of the object relative to the vehicle. Thus, the sonar device 16 functions as a ranging device that measures the distance between the vehicle 102 and an obstacle around the vehicle.

In particular, the sonar device 16 measures a first distance L1 between a first obstacle and a first end portion that is one of a plurality of end portions of the vehicle and closest to the first obstacle, and a second distance L2 between a second obstacle and a second end portion that is another of the plurality of end portions of the vehicle and closest to the second obstacle. The plurality of end portions of the vehicle may be the front end portion, the left front end corner portion, the right front end corner portion, the rear end portion, the left rear end corner portion, and the right rear end corner portion. Further, the first and second end portions may be two end portions in such a positional relationship that when the vehicle shifts relative to the immobile first and second obstacles, one of the first and second distances decreases while the other of the first and second distances increases.

Like a steering wheel not shown in FIG. 1, the setting operation unit 18 is provided at a position at which the driver can operate it, and is operated by the driver. While this is not shown in FIG. 1, the setting operation unit 18 includes an obstacle alarm switch. When the obstacle alarm switch is on, the driving assistance ECU 10 executes the obstacle alarm control.

A drive device 22 that accelerates the vehicle 102 by applying a driving force to driving wheels 24 is connected to the drive ECU 20. At normal times, the drive ECU 20 controls the drive device 22 such that the driving force generated by the drive device 22 varies according to the driver's propulsive operation, and upon receiving a command signal from the driving assistance ECU 10, controls the drive device 22 based on the command signal.

A braking device 32 that applies a braking force to wheels 34 to decelerate the vehicle 102 by braking is connected to the braking ECU 30. At normal times, the braking ECU 30 controls the braking device such that the braking force generated by the braking device 32 varies according to the driver's braking operation, and upon receiving a command signal from the driving assistance ECU 10, performs autonomous braking by controlling the braking device 32 based on the command signal.

An alarm generation device 52 that generates an alarm, a touch-panel display 54 that displays a status of control by the driving assistance ECU 10 etc., and a speaker 56 that makes a notification to the driver by voice are connected to the meter ECU 50. When the meter ECU 50 receives a command signal from the driving assistance ECU 10, the alarm generation device 52, the display 54, and the speaker 56 are controlled by the meter ECU 50 based on the command signal.

The alarm generation device 52 includes an alarm buzzer that generates an auditory alarm. When the first distance L1 or the second distance L2 is equal to or smaller than a first reference Lc1 (a positive constant) and equal to or larger than a second reference Lc2 (a positive constant smaller than Lc1), the alarm buzzer generates an alarm of an intermittent sound as an alarm of a first form. Further, when the first or second distance is equal to or smaller than the second reference Lc2, the alarm buzzer generates an alarm of a continuous sound as an alarm of a second form. The alarm generation device 52 may be configured to generate an alarm as part of collision prevention control upon determining that there is a possibility that the vehicle 102 may collide with an obstacle. Further, the alarm generation device 52 may include a visual alarm generation device, such as an alarm lamp, or a physical alarm generation device that generates a physical alarm, such as vibration of a seat.

For example, the display 54 may be a multi-information display on which meters and various pieces of information are displayed, or may be a display of a navigation device to be described later. As will be described later, upon receiving a signal from the driving assistance ECU 10, the display 54 displays information relating to the obstacle alarm control.

Driving operation sensors 60 and vehicle state sensors 70 are also connected to the CAN 104. Information detected by the driving operation sensors 60 and the vehicle state sensors 70 (referred to as "sensor information") is transmitted to the CAN 104. The sensor information transmitted to the CAN 104 can be used as appropriate in each ECU. The sensor information is information of sensors connected to a certain ECU, and may be transmitted from that certain ECU to the CAN 104.

The driving operation sensors 60 include a propulsive operation amount sensor, a braking operation amount sensor, and a brake switch. The driving operation sensors 60 further include a steering angle sensor, a steering torque sensor, etc. The vehicle state sensors 70 include a vehicle speed sensor, a front-rear acceleration sensor, a lateral acceleration sensor, a yaw rate sensor, etc.

First Embodiment

Figure 2:
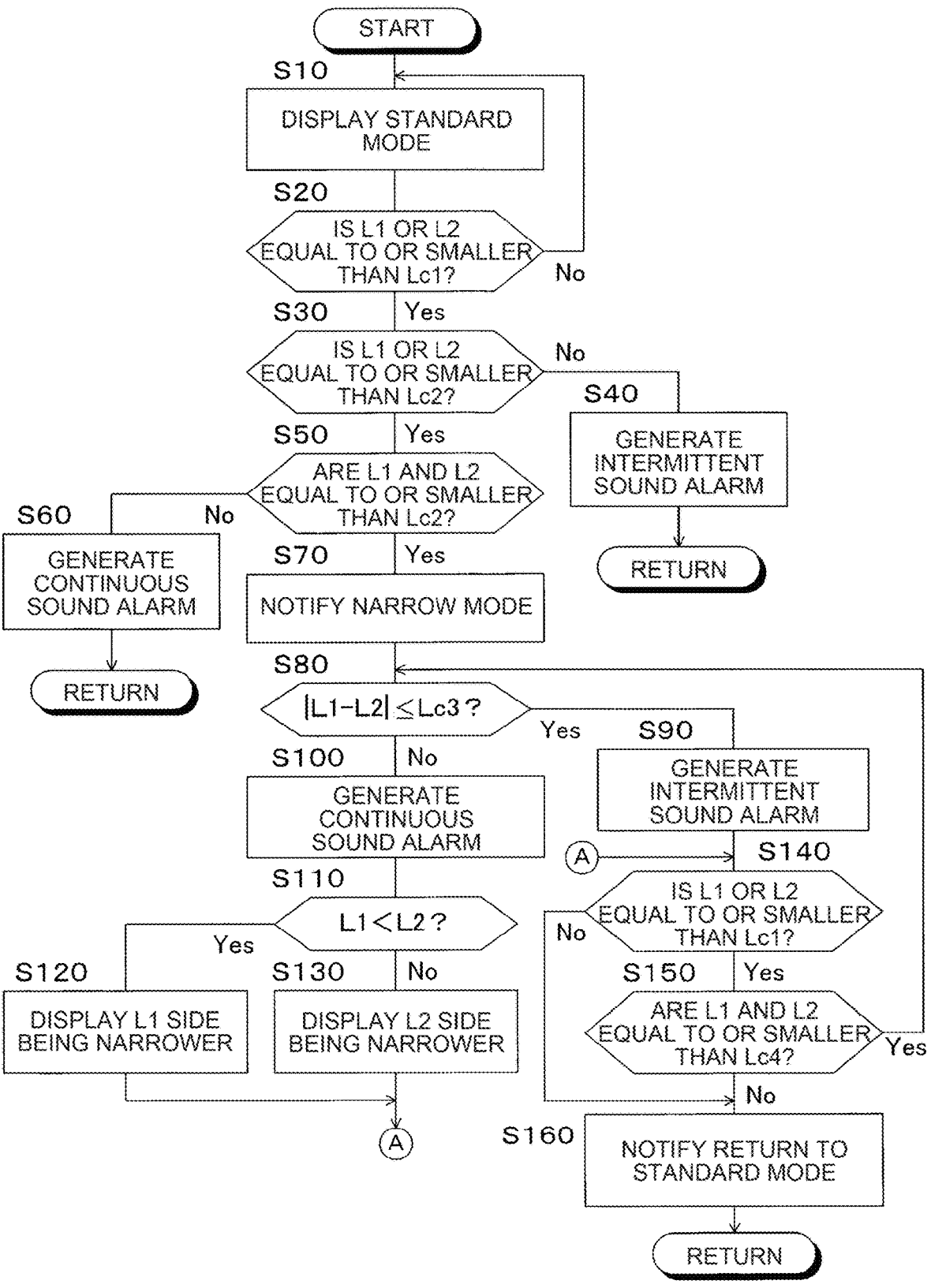
FIG. 2 is a flowchart corresponding to an obstacle alarm control program in a first embodiment.

In a first embodiment, the ROM of the driving assistance ECU 10 stores an obstacle alarm control program corresponding to the flowchart shown in FIG. 2.
First Obstacle Alarm Control (FIG. 2)

Next, the obstacle alarm control in the first embodiment will be described with reference to the flowchart shown in FIG. 2. The obstacle alarm control according to the flowchart shown in FIG. 2 is executed repeatedly at predetermined time intervals by the CPU of the driving assistance ECU 10 in a situation where the obstacle alarm switch is on.

First, in step S10, by outputting a command signal to the meter ECU 50, the CPU displays on the display 54 information that the obstacle alarm control is executed in a standard mode. This display may be omitted.

In step S20, the CPU determines whether the first distance L1 or the second distance L2 is equal to or smaller than the first reference value Lc1. When a negative determination is made, the current control returns to step S10, and when a positive determination is made, the current control proceeds to step S30. When no obstacle is detected by the sonar device 16, a negative determination is made. Further, when a negative determination is made in a situation where an alarm is being generated, the generation of the alarm is stopped.

In step S30, the CPU determines whether the first distance L1 or the second distance L2 is equal to or smaller than the second reference value Lc2. When a positive determination is made, the current control proceeds to step S50, and when a negative determination is made, the current control proceeds to step S40.

In step S40, by outputting a command signal to the meter ECU 50, the CPU activates the buzzer of the alarm generation device 52 to thereby generate an alarm of an intermittent sound as the alarm of the first form.

In step S50, the CPU determines whether the first distance L1 and the second distance L2 are equal to or smaller than the second reference value Lc2. When a positive determination is made, the current control proceeds to step S70, and when a negative determination is made, the current control proceeds to step S60.

In step S60, by outputting a command signal to the meter ECU 50, the CPU activates the buzzer of the alarm generation device 52 to thereby generate an alarm of a continuous sound as the alarm of the second form.

In step S70, by outputting a command signal to the meter ECU 50, the CPU displays on the display 54 information that the obstacle alarm control is executed in a narrow mode. When the CPU executes step S70 for the first time, by outputting a command signal to the meter ECU 50, the CPU activates the speaker 56 to thereby notify the information that the obstacle alarm control is executed in the narrow mode by voice. Thus, the information that the obstacle alarm control is executed in the narrow mode is made known to the driver by both the display on the display 54 and the notification through the speaker 56.

In step S80, the CPU calculates a third reference value Lc3 as a product of a constant coefficient C that is, for example, equal to or larger than 0.05 and equal to or smaller than 0.1 and the sum of the distances L1 and L2: C·(L1+L2). The third reference value Lc3 is smaller than the second reference value Lc2. Further, the CPU determines whether the absolute value of a difference between the distance L1 and the distance L2: L1-L2 is equal to or smaller than the third reference value Lc3, i.e., whether the distances L1 and L2 are substantially the same. When a negative determination is made, the current control proceeds to step S100, and when a positive determination is made, the current control proceeds to step S90.

In step S90, as in step S40, by outputting a command signal to the meter ECU 50, the CPU activates the buzzer of the alarm generation device 52 to thereby generate an alarm of an intermittent sound as the alarm of the first form.

In step S100, as in step S60, by outputting a command signal to the meter ECU 50, the CPU activates the buzzer of the alarm generation device 52 to thereby generate an alarm of a continuous sound as the alarm of the second form.

In step S110, the CPU determines whether the first distance L1 is smaller than the second distance L2. When a negative determination is made, the current control proceeds to step S130, and when a positive determination is made, the current control proceeds to step S120.

In step S120, by outputting a command signal to the meter ECU 50, the CPU displays on the display 54 information that the first distance L1 is smaller than the second distance L2, for example, that the side of the first end portion is narrower than the side of the second end portion.

In step S130, by outputting a command signal to the meter ECU 50, the CPU displays on the display 54 information that the second distance L2 is smaller than the first distance L1, for example, that the side of the second end portion is narrower than the side of the first end portion.

In step S140, as in step S20, the CPU determines whether the first distance L1 or the second distance L2 is equal to or smaller than the first reference value Lc1. When a negative determination is made, the current control proceeds to step S160, and when a positive determination is made, the current control proceeds to step S150. Also in step S140, a negative determination is made when no obstacle is detected by the sonar device 16.

In step S150, the CPU determines whether both the first distance L1 and the second distance L2 are equal to or smaller than a fourth reference value Lc4 (a positive value larger than Lc2 and Lc3 and closer to Lc2 than to Lc1). When a positive determination is made, the current control returns to step S80, and when a negative determination is made, the current control proceeds to step S160.

In step S160, by outputting a command signal to the meter ECU 50, the CPU displays on the display 54 information that the obstacle alarm control returns to the standard mode. Further, by outputting a command signal to the meter ECU 50, the CPU activates the speaker 56 to thereby notify the information that the mode of the obstacle alarm control returns to the standard mode by voice. Thus, the information that the obstacle alarm control returns to the standard mode is made known to the driver by both the display on the display 54 and the notification through the speaker 56.

Workings of First Embodiment

When There are Obstacles in Lateral Directions of Vehicle (FIG. 4A, FIG. 4B, FIG. 4C, and FIG. 4D)

In this case, the obstacle alarm control according to the flowchart shown in FIG. 2 is executed. In FIG. 4A, FIG. 4B, FIG. 4C, and FIG. 4D, the vehicle 102 is traveling on a narrow travel road 108 between an obstacle 106L, such as a wall, on the left side and an obstacle 106R, such as a wall, on the right side. The distance L1 is the distance between the obstacle 106L on the left side of the vehicle 102 and the left front end corner portion of the vehicle, and the distance Lr is the distance between the obstacle 106R on the right side of the vehicle and the right front end corner portion of the vehicle. When the obstacles 106L and 106R are the first and second obstacles, respectively, the left front end corner portion and the right front end corner portion of the vehicle are the first and second end portions, respectively, and the distance L1 and the distance Lr are the first and second distances, respectively.

Figure 4A:
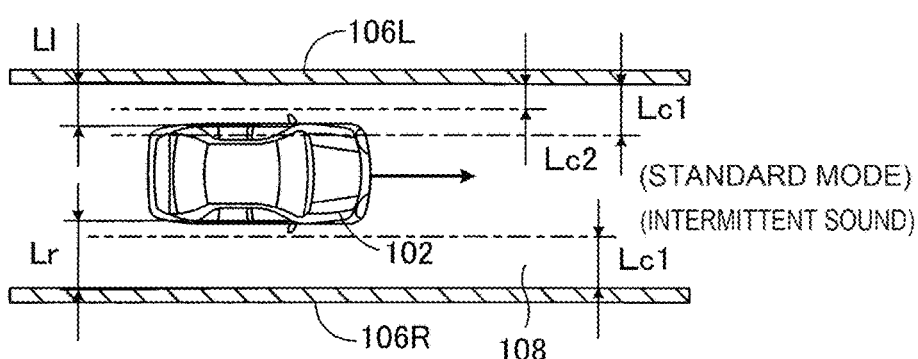
FIG. 4A is a view showing a situation where a vehicle travels on a narrow travel road between obstacles on a left side and a right side.

Case of FIG. 4A

When the distance L1 or Lr is equal to or smaller than the first reference value Lc1 and both the distances L1 and Lr are larger than the second reference value Lc2 as shown in FIG. 4A, a positive determination and a negative determination are made in steps S20 and S30, respectively. Thus, an alarm of an intermittent sound is generated in step S40.

Figure 4B:
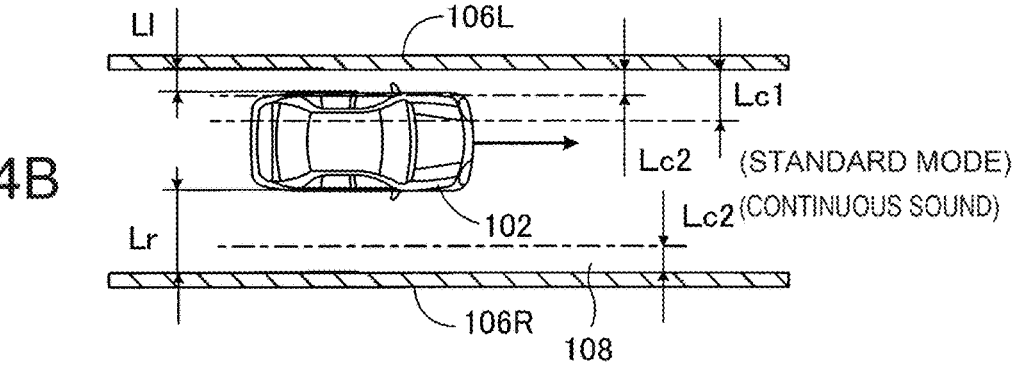
FIG. 4B is a view showing a situation where the vehicle travels on the narrow travel road between the obstacles on the left side and the right side.

Case of FIG. 4B

When one of the distances L1 and Lr is equal to or smaller than the second reference value Lc2 and the other of the distances L1 and Lr is larger than the second reference value Lc2 as shown in FIG. 4B, a positive determination is made in each of steps S20 and S30 and a negative determination is made in step S50. Thus, an alarm of a continuous sound is generated in step S60.

In the cases of FIG. 4A and FIG. 4B described above, the mode of the obstacle alarm control is set to the standard mode, and that information is made known.

Figure 4C:
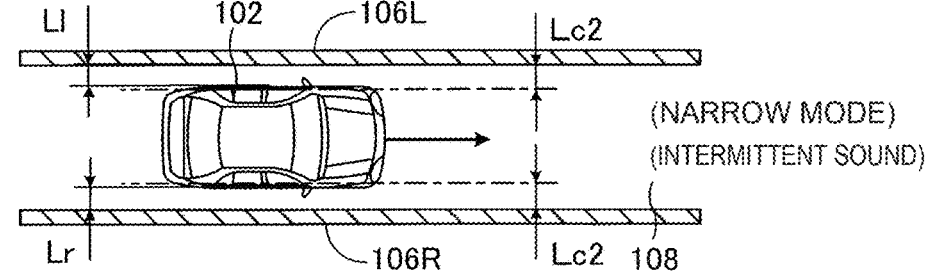
FIG. 4C is a view showing a situation where the vehicle travels on the narrow travel road between the obstacles on the left side and the right side.

Case of FIG. 4C

When both the distances L1 and Lr are equal to or smaller than the second reference value Lc2 as shown in FIG. 4C, a positive determination is made in each of steps S20, S30, and S50. Thus, in step S70, information that the obstacle alarm control is executed in the narrow mode is displayed on the display 54, and that information is made known.

In particular, when the magnitude of the difference between the distance L1 and the distance Lr is equal to or smaller than the third reference value Lc3, a positive determination is made in step S80. Thus, in step S90, an alarm of an intermittent sound is generated and the speaker 56 is activated to thereby notify the information that the obstacle alarm control is executed in the narrow mode by voice.

By recognizing that the mode of the obstacle alarm control is the narrow mode and that an alarm of an intermittent sound is being generated, the driver can recognize that both the distances L1 and Lr are equal to or smaller than the second reference value Lc2 and that these distances are substantially the same, and that therefore the vehicle is travelling substantially at the center of the travel road 108.

Figure 4D:
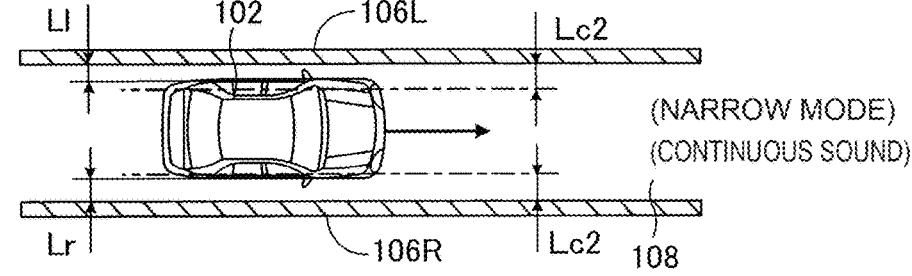
FIG. 4D is a view showing a situation where the vehicle travels on the narrow travel road between the obstacles on the left side and the right side.

Case of FIG. 4D

When both the distances L1 and Lr are equal to or smaller than the second reference value Lc2 and the magnitude of the difference between the distance L1 and the distance Lr is larger than the third reference value Lc3, a negative determination is made in step S80. Thus, an alarm of a continuous sound is generated in step S100.

In particular, when the distance L1 is smaller than Lr as shown in FIG. 4D, a positive determination is made in step S110, and information that the left-side distance L1 is smaller than the right-side distance Lr is displayed on the display 54 in step S120.

Conversely, when the distance L1 is larger than Lr, a negative determination is made in step S110, and information that the right-side distance Lr is smaller than the left-side distance L1 is displayed on the display 54 in step S130.

By recognizing that the mode of the obstacle alarm control is the narrow mode and that an alarm of a continuous sound is being generated, and by looking at the display on the display 54, the driver can recognize that both the distances L1 and Lr are equal to or smaller than the second reference value Lc2, and which one of the distances L1 and Lr is smaller than the other. That is, the driver can recognize on which of the left and right sides of the travel road 108 the vehicle is traveling off-center.

When, as the vehicle 102 travels, the space between the left-side obstacle 106L and the right-side obstacle 106R increases and one of the distances L1 and Lr becomes larger than the fourth reference value Lc4, a negative determination is made in step S150. When both the distances L1 and Lr become larger than the first reference value Lc1, a negative determination is made in step S140. In these cases, information that the obstacle alarm control returns to the standard mode is made known in step S160.

Figure 5:
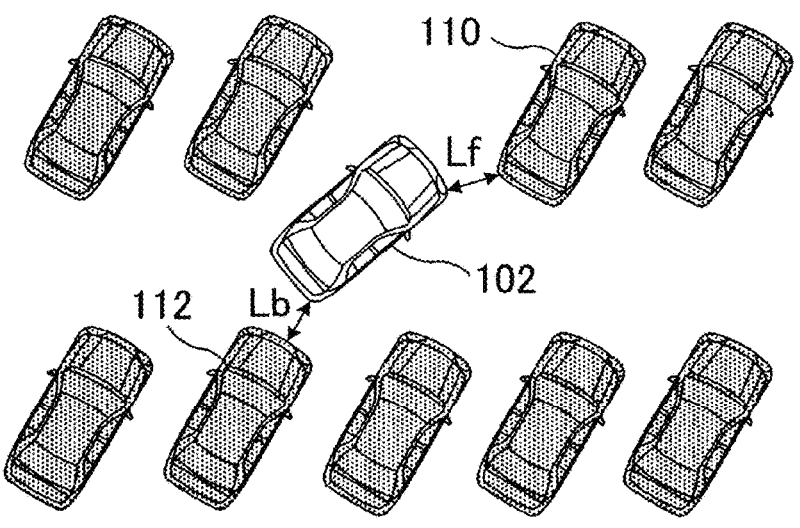
FIG. 5 is a view showing a situation where the vehicle moves backward from one of two rows of vehicles parked next to one another.
Figure 6:
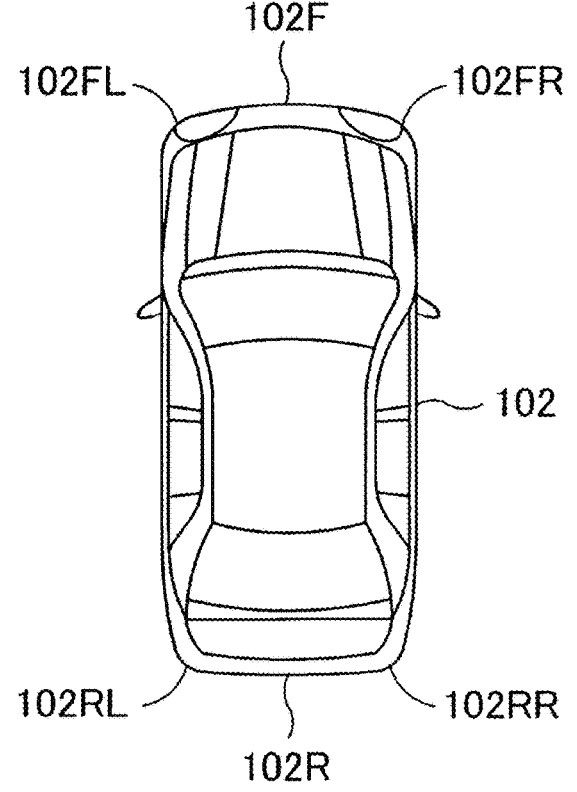
FIG. 6 is a view showing a plurality of end portions of the vehicle.

When there are Obstacles in Front-Rear Direction of Vehicle (FIG. 5)

As an example where there are obstacles in the front-rear direction of the vehicle 102, FIG. 5 shows a situation where the vehicle moves backward from one of two rows of vehicles parked next to one another. In FIG. 5, the distance Lf is the shortest distance between another vehicle 110 as an obstacle on the front side of the vehicle 102 and the right front end corner portion of the vehicle, and the distance Lb is the shortest distance between another vehicle 112 as an obstacle on the rear side of the vehicle and the right rear end corner portion of the vehicle. When the other vehicles 110 and 112 are the first and second obstacles, respectively, the right front end corner portion and the right rear end corner portion of the vehicle are the first and second end portions, respectively, and the distance Lf and the distance Lb are the first and second distances, respectively.

When the distance Lf or Lb is equal to or smaller than the first reference value Lc1 and both the distances Lf and Lb are larger than the second reference value Lc2, a positive determination and a negative determination are made in steps S20 and S30, respectively. Thus, an alarm of an intermittent sound is generated in step S40.

When one of the distances Lf and Lb is equal to or smaller than the second reference value Lc2 and the other of the distances Lf and Lb is larger than the second reference value Lc2, a positive determination is made in each of steps S20 and S30, and a negative determination is made in step S50. Thus, an alarm of a continuous sound is generated in step S60.

When both the distances Lf and Lb are equal to or smaller than the second reference value Lc2, a positive determination is made in each of steps S20, S30, and S50. Thus, in step S70, information that the obstacle alarm control is executed in the narrow mode is displayed on the display 54, and that information is made known.

In particular, when the magnitude of the difference between the distance Lf and the distance Lb is equal to or smaller than the third reference value Lc3, a positive determination is made in step S80. Thus, in step S90, an alarm of an intermittent sound is generated and the speaker 56 is activated to thereby notify the information that the obstacle alarm control is executed in the narrow mode by voice, and that information is made known.

By recognizing that the mode of the obstacle alarm control is the narrow mode and that an alarm of an intermittent sound is being generated, the driver can recognize that both the distances Lf and Lb are equal to or smaller than the second reference value Lc2 and that these distances are substantially the same, and that therefore the vehicle 102 is located substantially at the center of the space between the other vehicle 110 on the front side and the other vehicle 112 on the rear side.

When both the distances Lf and Lb are equal to or smaller than the second reference value Lc2 and the magnitude of the difference between the distance Lf and the distance Lb is larger than the third reference value Lc3, a negative determination is made in step S80. Thus, an alarm of a continuous sound is generated in step S100.

In particular, when the distance Lf is smaller than Lb, a positive determination is made in step S110, and information that the front-side distance Lf is smaller than the rear-side distance Lb is displayed on the display 54 in step S120.

Conversely, when the distance Lb is smaller than Lf, a negative determination is made in step S110, and information that the rear-side distance Lb is smaller than the front-side distance Lf is displayed on the display 54 in step S130.

By recognizing that the mode of the obstacle alarm control is the narrow mode and that an alarm of a continuous sound is being generated, and by looking at the display on the display 54, the driver can recognize that both the distances Lf and Lb are equal to or smaller than the second reference value Lc2 and that one of the distances Lf and Lb is smaller than the other, and therefore to which of the other vehicle 110 on the front side and the other vehicle 112 on the rear side the vehicle is closer.

When, as the vehicle 102 moves, the distance to the other vehicle on the front side or the distance to the other vehicle on the rear side increases and one of the distances Lf and Lb becomes larger than the fourth reference value Lc4, a negative determination is made in step S150. When both the distances Lf and Lb become larger than the first reference value Lc1, a negative determination is made in step S140. In these cases, in step S160, information that the obstacle alarm control returns to a standard front-rear direction mode is displayed on the display 54 and the speaker 56 is activated to thereby notify the information that the mode of the obstacle alarm control returns to the standard mode by voice.

Second Embodiment

Figure 3:
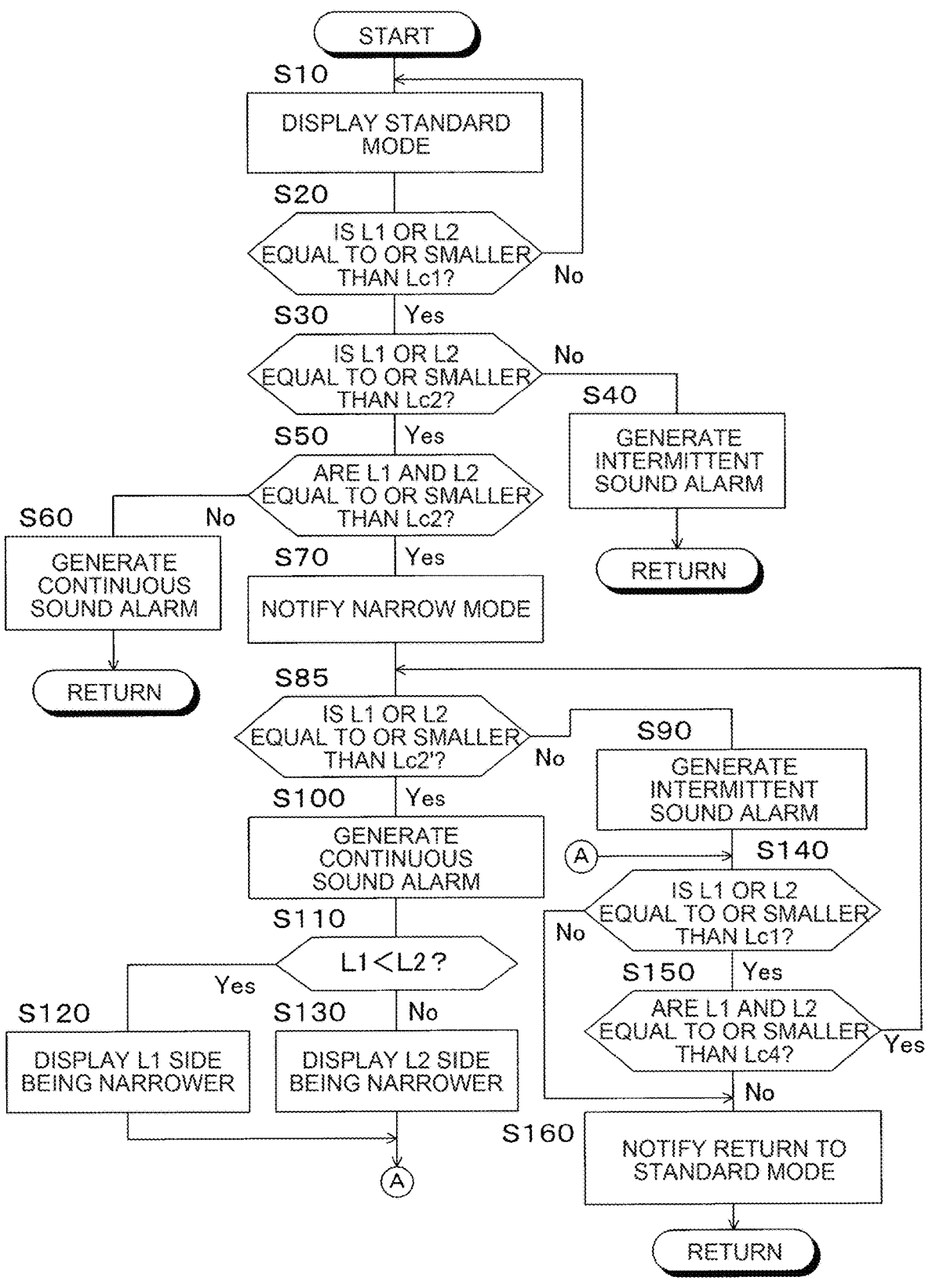
FIG. 3 is a flowchart corresponding to an obstacle alarm control program in a second embodiment.

In a second embodiment, the ROM of the driving assistance ECU 10 stores an obstacle alarm control program corresponding to the flowchart shown in FIG. 3. The obstacle alarm control according to the flowchart shown in FIG. 3 is also executed repeatedly at predetermined time intervals by the CPU of the driving assistance ECU 10 in a situation where the obstacle alarm switch is on.

As can be seen from a comparison between FIG. 3 and FIG. 2, steps S10 through S70 and steps S90 through S160 are executed in the same manner as in the first embodiment, but when step S70 is completed, the current control proceeds to step S85.

In step S85, the CPU determines whether the first distance L1 or the second distance L2 is equal to or smaller than a changed second reference value Lc2' (a positive constant smaller than the second reference value Lc2). When a negative determination is made, the current control proceeds to step S90, and when a positive determination is made, the current control proceeds to step S100.

According to the second embodiment, when the first distance L1 and the second distance L2 become equal to or smaller than the second reference value Lc2 and the mode of the obstacle alarm control is changed to the narrow mode, in step S85, it is determined whether the distance L1 or L2 is equal to or smaller than the changed second reference value Lc2'. When the distances L1 and L2 are larger than the changed second reference value Lc2', an alarm of an intermittent sound is generated in step S90. On the other hand, when the distance L1 or L2 is equal to or smaller than the changed second reference value Lc2', an alarm of a continuous sound is generated in step S100.

Advantages of First and Second Embodiments

According to the first and second embodiments, the condition for switching the form of the alarm (S80, S85) when both the first distance L1 and the second distance L2 are equal to or smaller than the reference value Lc2 differs from the condition for switching the form of the alarm (S30, S50) when only one of the first distance L1 and the second distance L2 is equal to or smaller than the reference value. Therefore, also when the vehicle travels between the first and second obstacles between which the space is small, as the condition for switching the form of the alarm (an intermittent sound or a continuous sound) is appropriately changed, it is possible to determine whether the vehicle is close to only one of the obstacles, i.e., whether the vehicle is traveling at the center between the two obstacles.

According to the first and second embodiments, when it is determined that both the first distance L1 and the second distance L2 are equal to or smaller than the second reference value Lc2 (S50), information that the mode of the obstacle alarm control is the narrow mode is displayed on the display 54 and a notification is made by voice (S70). Therefore, the driver can recognize whether the mode of the obstacle alarm control is the standard mode or the narrow mode.

Further, according to the first and second embodiments, the form of the alarm is switched such that, before the condition for switching the form of the alarm is changed, the form of the alarm is the first form (an intermittent sound, S40) when the first distance L1 or the second distance L2 is equal to or smaller than the first reference value Lc1 and larger than the second reference value Lc2, whereas the form of the alarm is the second form (a continuous sound, S60) when the first or second distance is equal to or smaller than the second reference value. Thus, when the form of the alarm is the second form, the driver can determine that the first or second distance is smaller compared with when the form of the alarm is the first form, and that the vehicle is close to the corresponding obstacle.

According to the first embodiment, when the absolute value of the difference between the first distance L1 and the second distance L2: L1-L2 is equal to or smaller than the third reference value Lc3 (S80), in a situation where information that the mode of the obstacle alarm control is the narrow mode is made known (S70), an alarm of an intermittent sound is generated as the alarm of the first form (S90). On the other hand, when the absolute value of the difference L1-L2 exceeds the third reference value Lc3, in a situation where information that the mode of the obstacle alarm control is the narrow mode is made known, an alarm of a continuous sound is generated as the alarm of the second form (S100).

Therefore, by recognizing the contents of the information and the alarm sound, the driver can determine that both the first distance L1 and the second distance L2 are equal to or smaller than the second reference value Lc2 before being changed, and whether the vehicle is located at the center between the two obstacles and whether the vehicle is close to one of the two obstacles.

Further, according to the first embodiment, in the case where the magnitude of the difference is larger than the reference value Lc3 for the difference, when the first distance L1 is smaller than the second distance L2, information that the first distance L1 is smaller than the second distance L2 is displayed on the display 54 (S120). Conversely, when the first distance L1 is not smaller than the second distance L2, information that the second distance L2 is smaller than the first distance L1 is displayed on the display 54 (S120).

Therefore, by recognizing the contents of the information and the alarm sound, the driver can recognize that both the first distance L1 and the second distance L2 are equal to or smaller than the second reference value Lc2, and which of the first and second end portions is close to the corresponding obstacle.

Further, according to the second embodiment, when both the first distance L1 and the second distance L2 become equal to or smaller than the second reference value Lc2, the second reference value is changed to the smaller value Lc2' and thereby the condition for switching the form of the alarm is changed (S85). Thus, while the vehicle is traveling substantially at the central position between the first and second obstacles in a situation where the mode of the obstacle alarm control is the narrow mode, the driver can determine which of the first and second forms the form of the alarm is, and can determine whether the vehicle is close to one of the first and second obstacles.

According to the second embodiment, when the first distance L1 is smaller than the second distance L2, information that the first distance L1 is smaller than the second distance L2 is displayed on the display 54 (S120). Conversely, when the first distance L1 is not smaller than the second distance L2, information that the second distance L2 is smaller than the first distance L1 is displayed on the display 54 (S120).

Therefore, by recognizing the contents of the information and the alarm sound, the driver can recognize that both the first distance L1 and the second distance L2 are equal to or smaller than the second reference value Lc2, and which of the first and second end portions is close to the corresponding obstacle.

According to the first and second embodiments, when the condition for switching the form of the alarm is changed as the obstacle alarm control is changed from the standard mode to the narrow mode, in step S70, the change of the condition for switching the form of the alarm is made known to the driver. Therefore, the driver can recognize whether the condition for switching the form of the alarm has been changed, i.e., whether the control mode is the standard mode or the narrow mode. Thus, not only when the vehicle travels between the first and second obstacles between which the space is constant and small but also when the vehicle travels between the first and second obstacles between which the space is small and changes, by recognizing the control mode and determining the form of the alarm (an intermittent sound or a continuous sound), it is possible to determine whether the vehicle is close to only one of the obstacles, i.e., whether the vehicle is traveling at the center between the two obstacles.

Further, according to the first and second embodiments, the alarm sounds generated in steps S40 and S90 are intermittent sounds, and the alarm sounds generated in steps S60 and S100 are continuous sounds. Thus, compared with when the alarm sounds generated in steps S40 and S90 differ from each other and the alarm sounds generated in steps S60 and S100 differ from each other, there are fewer forms of the alarm sound, so that it is less likely for the driver to misjudge due to there being many forms of the alarm sound.

While the present disclosure has been described in detail above in terms of specific embodiments, the present disclosure is not limited to the above-described embodiments, and it is obvious to those skilled in the art that various other embodiments are possible within the range of the present disclosure.

For example, in the above-described first and second embodiments, it is determined whether the first distance L1 is smaller than the second distance L2 in step S110, and which of the distances L1 and L2 is smaller is displayed on the display 54 in steps S120 and S130. However, steps S110 through S130 may be omitted.

In the above-described first and second embodiments, the alarm sounds generated in steps S40 and S90 are intermittent sounds, and the alarm sounds generated in steps S60 and S100 are continuous sounds. However, the alarm sounds generated in steps S40 and S90 may differ from each other, and the alarm sounds generated in steps S60 and S100 may also differ from each other.

What is claimed is:

1. A vehicle obstacle alarm device comprising:
an alarm generation device capable of changing a form of an alarm;
a ranging device that measures a distance between a vehicle and an obstacle around the vehicle; and
a control unit configured to switch the form of the alarm generated by the alarm generation device according to the distance between the vehicle and the obstacle measured by the ranging device, wherein:
the ranging device measures a first distance between a first obstacle and a first end portion that is one of a plurality of end portions of the vehicle and closest to the first obstacle, and a second distance between a second obstacle and a second end portion that is another of the plurality of end portions of the vehicle and closest to the second obstacle; and
the control unit is configured to change a condition for switching the form of the alarm such that the condition for switching the form of the alarm when both the first and second distances are equal to or smaller than a reference value differs from the condition for switching the form of the alarm when only one of the first and second distances is equal to or smaller than the reference value.

2. The vehicle obstacle alarm device according to claim 1, wherein the control unit is configured to switch the form of the alarm such that, before the condition for switching the form of the alarm is changed, the form of the alarm is a first form when the first or second distance is equal to or smaller than a first reference value and larger than a second reference value, while the form of the alarm is a second form when the first or second distance is equal to or smaller than the second reference value.

3. The vehicle obstacle alarm device according to claim 2, wherein the control unit is configured to change the condition for switching the form of the alarm by changing the second reference value to a smaller value when both the first and second distances become equal to or smaller than the second reference value.

4. The vehicle obstacle alarm device according to claim 2, wherein the control unit is configured to switch the form of the alarm such that, in a case where the condition for switching the form of the alarm has been changed, the form of the alarm is the first form when a magnitude of a difference between the first and second distances is equal to or smaller than a reference value for the difference, while the form of the alarm is the second form when the magnitude of the difference is larger than the reference value for the difference.

5. The vehicle obstacle alarm device according to claim 1, wherein the control unit is configured to, when changing the condition for switching the form of the alarm, let a driver know the change in the condition for switching the form of the alarm.

* * * * *